(12) United States Patent
Tie Long et al.

(10) Patent No.: US 11,795,565 B2
(45) Date of Patent: Oct. 24, 2023

(54) SURFACE TREATMENT METHOD OF COPPER FOR THE ASSEMBLY OF POLYMER AND COPPER

(71) Applicant: DONGGUAN DSP TECHNOLOGY CO., LTD., Dongguan (CN)

(72) Inventors: Guo Tie Long, Shenzhen (CN); Tan Yonggang, Shenzhen (CN)

(73) Assignee: DONGGUAN DSP TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/807,190

(22) Filed: Jun. 16, 2022

(65) Prior Publication Data

US 2022/0403543 A1 Dec. 22, 2022

(30) Foreign Application Priority Data

Jun. 18, 2021 (JP) .................................. 2021-102058

(51) Int. Cl.
 C25D 11/34 (2006.01)
 C25D 11/02 (2006.01)
 C25F 3/02 (2006.01)

(52) U.S. Cl.
 CPC ............ *C25D 11/34* (2013.01); *C25D 11/024* (2013.01); *C25F 3/02* (2013.01)

(58) Field of Classification Search
 None
 See application file for complete search history.

(56) References Cited

FOREIGN PATENT DOCUMENTS

| EP | 3819409 A1 * | 5/2021 | ........... B29C 66/026 |
| JP | 2018-182043 A | 11/2018 | |
| KR | 20160132315 A * | 11/2016 | |

OTHER PUBLICATIONS

Oh et al. KR 20160132315A, machine translation (Year: 2016).*

* cited by examiner

*Primary Examiner* — Wojciech Haske
(74) *Attorney, Agent, or Firm* — Greer, Burns & Crain, Ltd (57) ABSTRACT

A method to treat the copper surface to manufacture the metallic assembly with the polymer and copper to have excellent bonding strength is disclosed. The present method is for treating the surface of copper for the bonded coupling of the mixture of polymer and copper by providing a method to treat the surface of copper, with (a) an etching step with electric etching of the surface of copper,
  (b) the first anodizing stage to anodize the surface of copper, and
  (c) the second anodizing stage to anodize the above is firstly anodized,
  after an ultrasonic treatment of the secondly anodized copper, the copper is oxidized again.

7 Claims, 11 Drawing Sheets

FIG. 1

Electrolytic Etching

FIG. 1A

1st Anodization

FIG. 1B

2nd Anodization
with Silane Coupling Agent

FIG. 1C

Ultrasonic Wave

FIG. 1D

Oxidation

1st Anodization & 2nd Anodization and Electrolytic Etching

Figure. Diagram of the Pulsed Unipolar Output for Two-step Anodization

Degreasing   Electrolytic   1st Anodization   2nd Anodization   Ultrasonic   Oxidation
             Etching                          With Silane       Wave
                                              Coupling Agent

FIG. 6A

1st Anodization   2nd Anodization   Ultrasonic Wave   Oxidation
                  With Silane
                  Coupling Agent

SURFACE TREATMENT METHOD OF COPPER FOR THE ASSEMBLY OF POLYMER AND COPPER

BACKGROUND

This invention is the surface treatment Method of copper for the bonded coupling of the assembly of polymer and copper. More specifically, through the first and second anodizing of the surface of copper, this is a method to treat the copper surface for the assembly of polymer and copper to maximize the bonding of the assembly of the polymer and the surface of the copper.

The assembly of polymer and copper has been used in various ways for lithium-ion batteries for automotive, smartphones, or electronic devices, requiring waterproof characteristics. The bonding strength of polymer and copper, however, has been pointed out as a potential issue due to its low reliability.

Thus, by anodizing the copper and raising the activity and frictional force of the surface of copper, an even stronger bonding between copper and polymer has been used for manufacturing thereof. However, even with the first anodizing treatment, it's impossible to acquire sufficient adhesion and shielding with polymer.

PRIOR ART

Patent Application

[Patent Application 1] Japan Patent Publication No. 2018-182043

SUMMARY

This invention is a method to treat the surface of copper to solve the above issue. The purpose of this invention is to provide a method to treat the surface of copper to manufacture metallic assembly of polymer and copper with excellent bonding strength and shielding.

MEASURES TO SOLVE THE TASK

The purpose of the invention is a method to treat the surface of copper for the bonded coupling of the mixture of polymer and copper, with characteristics of
  (a) an etching step with electric etching of the surface of copper,
  (b) the first anodizing stage to anodize the surface of copper, and
  (c) the second anodizing stage to anodize the above firstly anodized copper.

In stage (b), it is processed for 1 to 15 minutes with the current density of $0.01$~$5$ $A/dm^2$ while using a 500 ms pulse rectifier at the temperature of 30 to 90° C. in a mixed solvent of 0.01~0.05 wt. % of $NaNO_2$, 0.1~1 wt. % of $NH_4F$ as an adjuvant, and 0.01~0.1 wt. % of $C_2H_4(OH)_2$ as an additive.

In the (c) stage, the second anodizing treatment proceeds with a mixed solvent of 0.1~2 wt. % of $C_2K_2O_4$, 0.1~0.5 wt. % of $Na_2O_3Si$ as an adjuvant, 0.01~0.1 wt. % of $C_3H_8O_3$ as an adjuvant, and 0.001~0.01 wt. % of $C_{20}H_{24}Na_2O_{10}S_2$ as an adjuvant, while using a pulse rectifier for 500 ms at the temperature of 30 to 70° C., at the current density of 0.01~1 $A/dm^2$, for 1 to 10 minutes.

In the (c) stage, the used electrolytes may be one of $C_2K_2O_4$, $NaHCO_3$, $NaOH$, $Na_2CO_3$, $Na_2SO_4$, $K_2SO_3$, $Na_2SO_3$, $NaNO_2$, $KNO_2$, $NaNO_3$, $NaClO_4$, $CH_3COONa$, $Na_2B_2O_7$, $NaH_2PO_2$, $(NaPO_3)_6$, $Na_2MoO_4$, $Na_3SiO_3$ and $Na_2HPO_3$.

In the (c) stage, a Silane coupling agent of 0.01~1 wt. % is to be utilized as an additive to the mixed solvent.

In the (c) stage, the Silane coupling additive as the additive may be one of $(RO)_3Si$—$(CH_2)_3$—$NH_2$, $(RO)_3Si$—$(CH_2)_2$—$Si(OC_2H_5)_3$, $(RO)_3Si$—$(CH_2)_3$—$SH$, $(RO)_3Si$—$CH$=$CH_2$, $(RO)_3Si$—$(CH_3)_3$—$OOC(CH_3)C$=$CH_2$, $(RO)_3Si$—$(CH_3)_3$—$O$—$CHCH_2O$ and $(RO)_3Si$—$(CH_2)_{15}CH_3$.

After the (c) stage, the copper after the second anodizing treatment shall undergo an ultrasonic treatment.

The ultrasonic treatment shall proceed with a solvent of $H_2SO_4$ of 0.001~0.01 wt. % after adding an additive, $C_2H_4(OH)_2$ of 0.001~0.01 wt. %, for 1 to 3 minutes at 400 W, 24~100 kHz, at the temperature of 30 to 60° C.

After the ultrasonic treatment, the copper shall proceed to oxidization.

The oxidization treatment shall proceed with a solvent of $H_2O_2$ of 0.1~3 wt. % after adding an additive, $Na_2S_2O_3$ of 0.001~0.01 wt. %, for 10 seconds to five minutes, at the temperature of 30 to 60° C.

After the oxidization treatment, the copper shall dry up for five to ten minutes at a temperature of 70 to 80° C.

Effects of Invention

According to the invention, the treatment of the surface of copper in this invention has effects to maximize the bonding strength of polymer and copper by creating bumps of an oxidation film on the surface of the copper during the first anodizing, generating bumps on an acicular oxidation film of during the second anodizing, maximizing a contacting area, adding Silane coupling additive during the second anodizing, and producing a polymer on the bumps of the acicular oxidation film.

Also, it has the effects to maximize the bonding strength of the polymer and copper even stronger by treating with the ultrasonic wave after the second anodizing, creating fine cracks on the acicular oxidation film, and then, generating visible bumps on the fine oxidization film on the fine cracks by oxidizing it.

BRIEF DESCRIPTION OF THE DRAWINGS

FIG. 6 (B) are photos of the cross-section of the copper oxide film per process.
FIG. 7 A represents a specimen produced for the T-Bend test, and it has the polymer overlaid on the copper specimen from each Example.

DETAILED DESCRIPTION

Referring the below schematics, this explains how to manufacture the bonding of the polymer and copper with this invention.

This invention is a method to treat the surface of copper in order to maximize the bonded coupling of the polymer mixture with (a) an etching step with electric etching of the surface of copper,
(b) the first anodizing stage to anodize the surface of copper, and
(c) the second anodizing stage to anodize the above firstly anodized copper.

In stage (a), the surface of copper is processed with a mixed solution of 5 wt. % of $H_2SO_2$, 10 wt. % of $HNO_3$, 0.1 wt. % of additional surface-active agent, etc., at 30 to 70, while using a 500 ms pulse rectifier, 1~10 A/dm², with electric etching for 5 to 15 minutes.

The electric etching leaves irregular etching patterns on the surface of the copper.

In stage (b), it is processed for 1 to 15 minutes with the current density of 0.01~5 A/dm² while using a pulse rectifier at the temperature of 30 to 90° C. in a mixed solvent of 0.01~0.05 wt. % of $NaNO_2$, 0.1~1 wt. % of $NH_4F$ as an adjuvant, and 0.01~0.1 wt. % of $C_2H_4(OH)_2$ as an additive.

The first anodizing is to oxidize the surface of the etched copper and generate an oxide film of the copper with fine bumps on its surface.

In the (c) stage, the second anodizing treatment proceeds with a mixed solvent of 0.1~2 wt. % of $C_2K_2O_4$, 0.1~0.5 wt. % of $Na_2O_3Si$ as an adjuvant, 0.01~0.1 wt. % of $C_3H_8O_3$ as an adjuvant, and 0.001~0.01 wt. % of $C_{20}H_{24}Na_2O_{10}S_2$ as an adjuvant, while using a pulse rectifier for 500 ms at the temperature of 30 to 70° C., at the current density of 0.01~1 A/dm², for 1 to 10 minutes.

In the (c) stage, the electrolyte to be used may be one of $C_2K_2O_4$, $NaHCO_3$, $NaOH$, $Na_2CO_3$, $Na_2SO_4$, $K_2SO_3$, $Na_2SO_3$, $NaNO_2$, $KNO_2$, $NaNO_3$, $NaClO_4$, $CH_3COONa$, $Na_2B_2O_7$, $NaH_2PO_2$, $(NaPO_3)_6$, $Na_2MoO_4$, $Na_3SiO_3$, and $Na_2HPO_3$.

In stage (c), through the second anodizing, during the first anodizing on the copper surface, the bumps, generated from the first anodizing will formulate sharp bumps that look like fine thorns of cactus between the thin oxide film, and it will generate a thin rough complex of oxide films, maximize the contacting area, and then maximize the bonding strength between the polymer and copper.

In stage (c), 0.01~1 wt. % of a silane coupling additive as an additive is added to the mixed solution to maximize the bonding strength between the copper and polymer after the second anodizing.

The additional bonding strength was occurred due to the overlapping of van der Waals force between the polymer and the additive remaining in the copper oxide film from the second anodizing.

In the (c) stage, the Silane coupling additive as the additive may be one of $(RO)_3Si$—$(CH_2)_3$—$NH_2$, $(RO)_3Si$—$(CH_2)_2$—$Si(OC_2H_5)_3$, $(RO)_3Si$—$(CH_2)_3$—$SH$, $(RO)_3Si$—$CH$=$CH_2$, $(RO)_3Si$—$(CH_3)_3$—$OOC(CH_3)C$=$CH_2$, $(RO)_3Si$—$(CH_3)_3$—$O$—$CHCH_2O$ and $(RO)_3Si$—$(CH_2)_{15}CH_3$.

After the stage (c), upon the copper with the second anodizing treatment, the ultrasonic treatment shall proceed with a solvent of $H_2SO_4$ of 0.001~0.01 wt. % after adding an additive, $C_2H_4(OH)_2$ of 0.001~0.01 wt. %, for 1 to 3 minutes at 400 W, 24~100 kHz, at the temperature of 30 to 60° C.

From the ultrasonic treatment, via the first and second anodizing, fine micro-cracks are formed on the bumps of the oxide films, generated on the copper surface. It will roughen the surface even further, maximize the contacting area, and then maximize the bonding strength between the polymer and copper.

Finally, the copper after the ultrasonic treatment, the oxidization treatment shall proceed with a solvent of $H_2O_2$ of 0.1~3 wt. % after adding an additive, $Na_2S_2O_3$ of 0.001~0.01 wt. %, for 10 seconds to five minutes, at the temperature of 30 to 60° C.

With the final oxidation treatment, after the ultrasonic treatment, with the fine micro-cracks on the bumps of the oxide films of the copper surface, oxidation will occur, and fine bumps on the oxide films will occur additionally from the micro cracks. By this, the contacting area with the surface of copper shall be maximized and, hence, the bonding strength of the copper and polymer shall be maximized as well.

Figure 1:
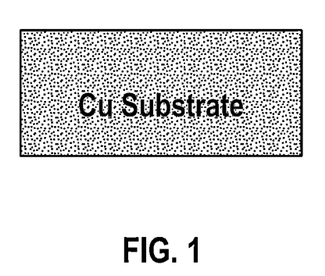
FIG. 1 represents the copper substrate prior to treatment.
Figure 1A:
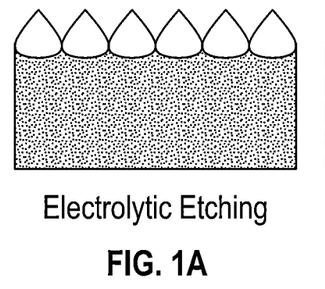
FIGS. 1A-E represent the changes in the oxide film from each process after treating the surface of copper.
Figure 1B:
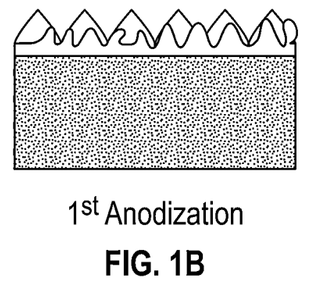
Figures 1C, 1D:
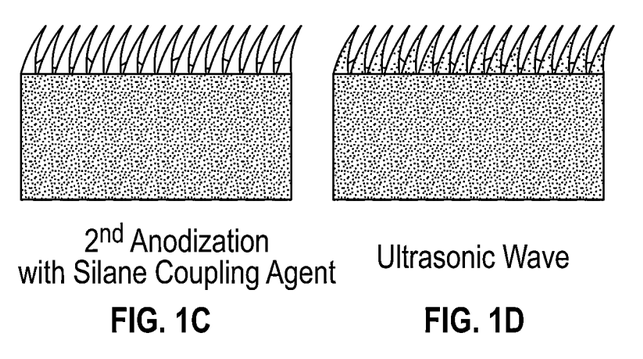
Figure 1E:
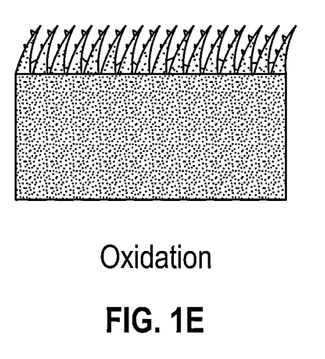

FIG. 1 represents the changes in the oxide film from each process after treating the surface of copper.

Figure 2:
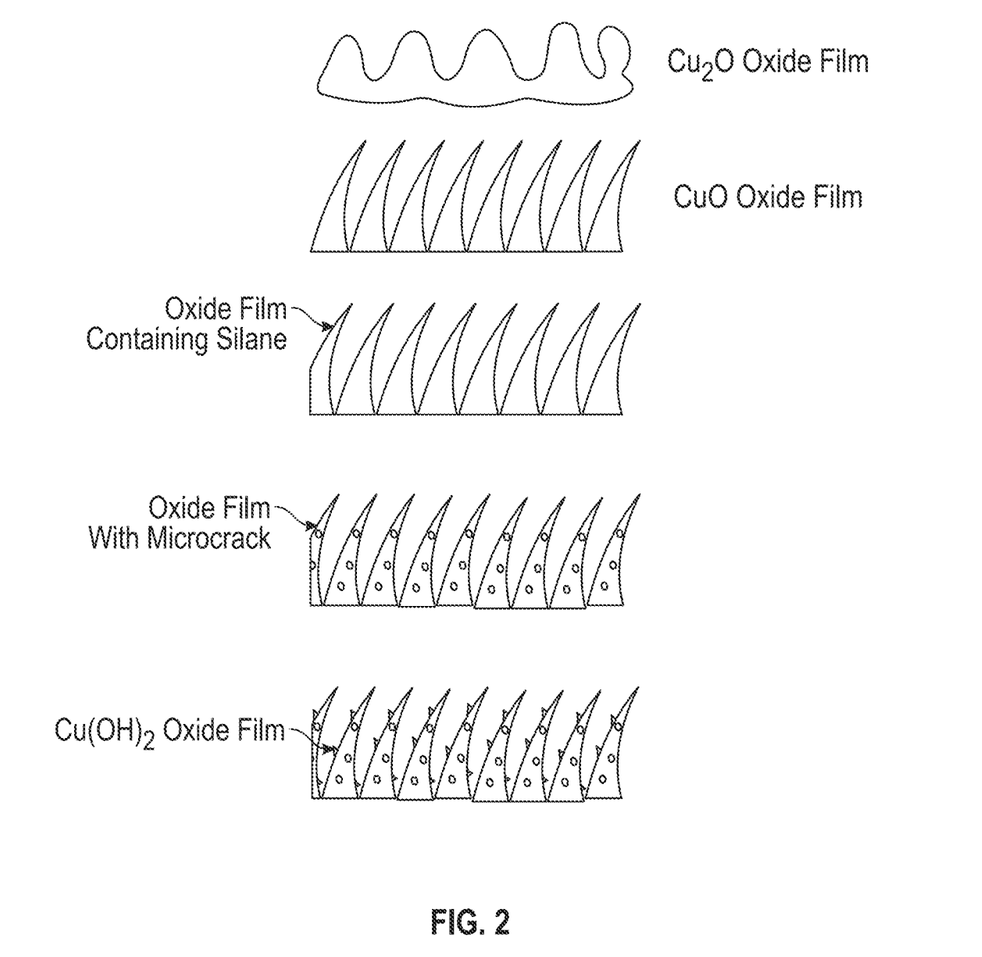
FIG. 2 is a detailed sequential representation of the final oxide film of FIG. 1.
Figure 3:
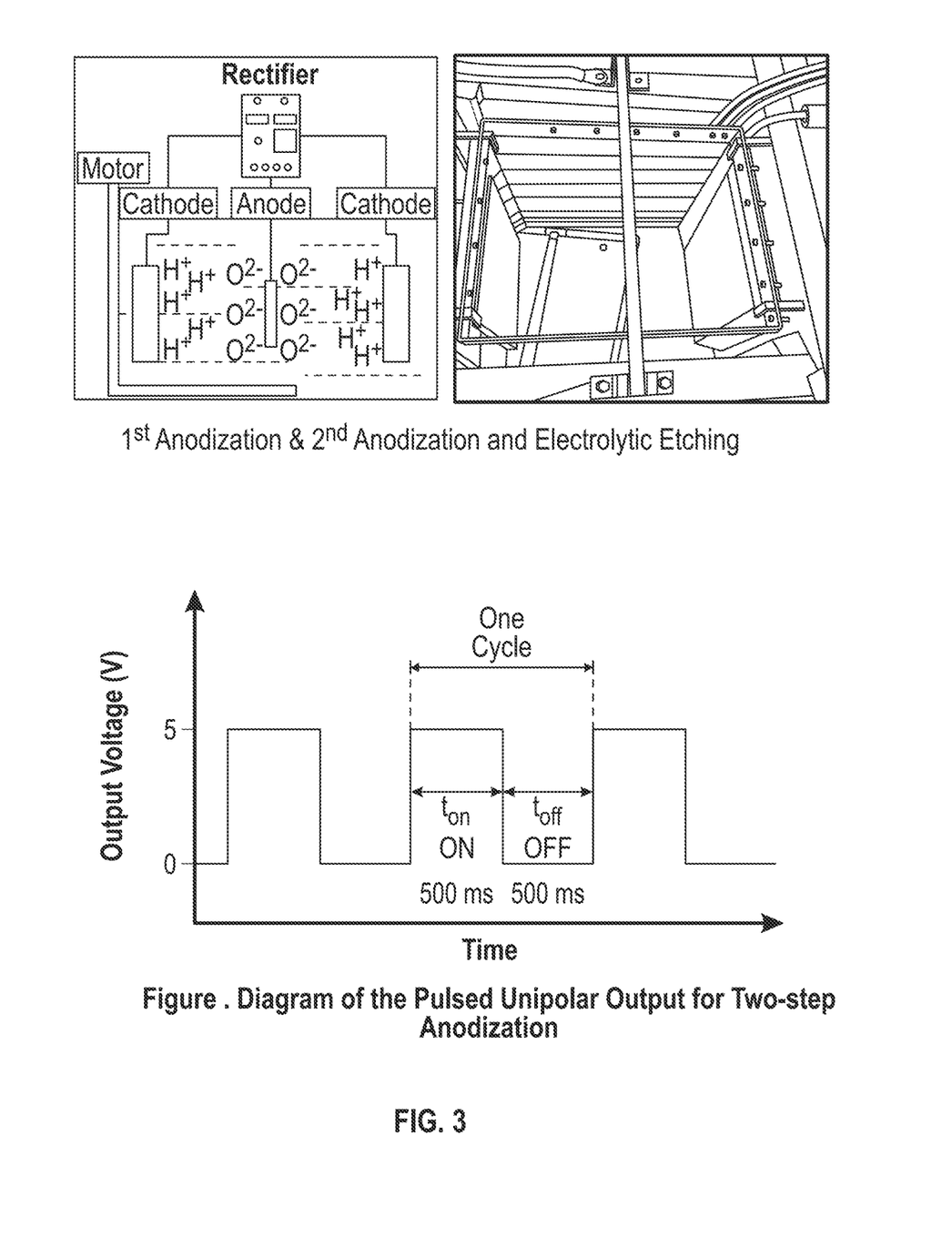
FIG. 3 depicts a device for the first and second anodizing and conditions thereof.
Figure 4:
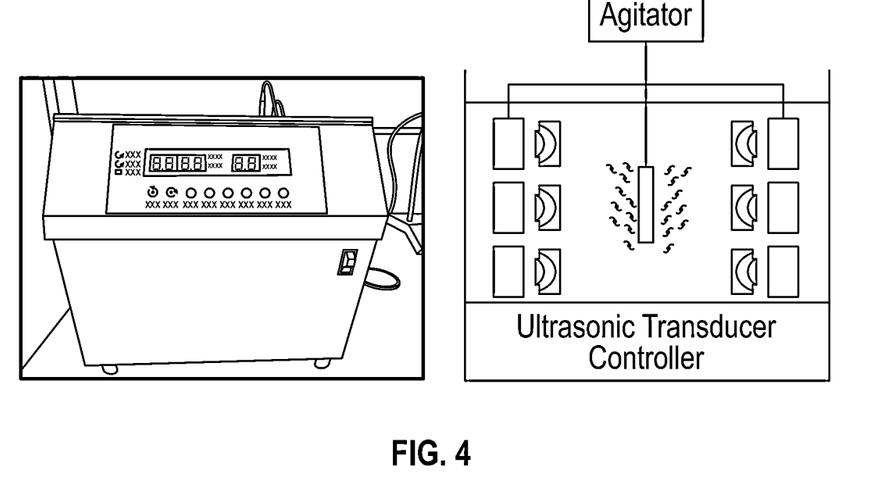
FIG. 4 is an ultrasonic device.
Figure 5:
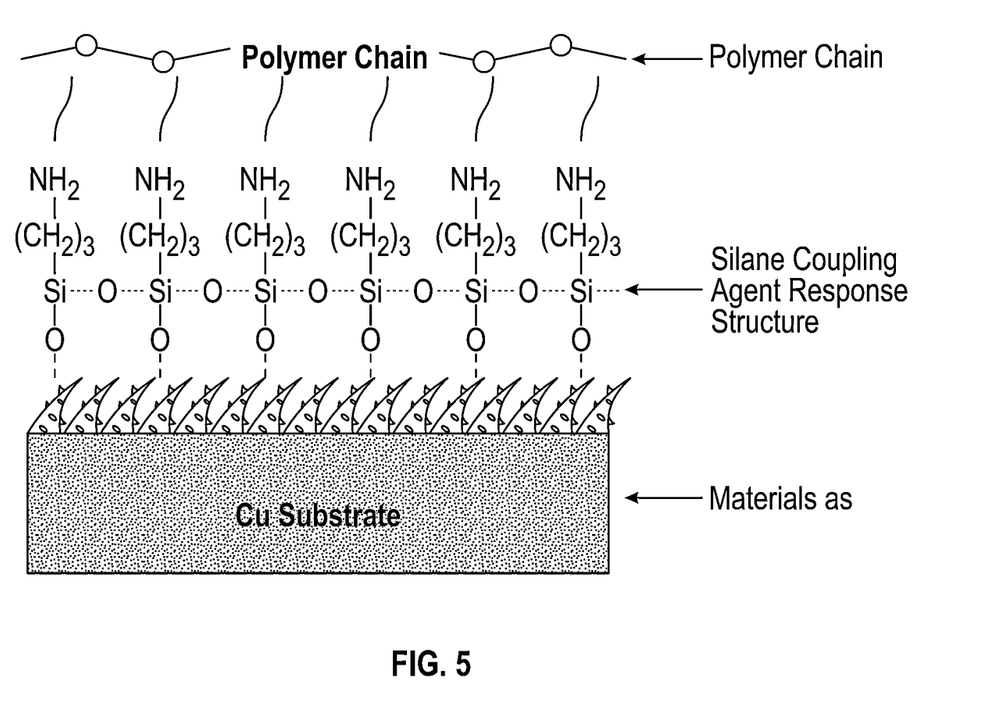
FIG. 5 represents the response structure of the Silane coupling agent between the polymer and copper.
Figure 6A:
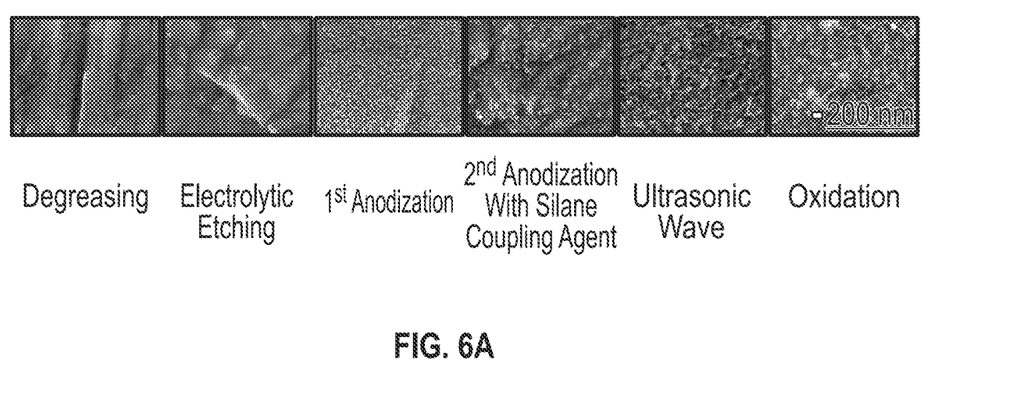
FIG. 6(A) are photos of the surface of the oxide film of the copper for each process.
Figure 6B:
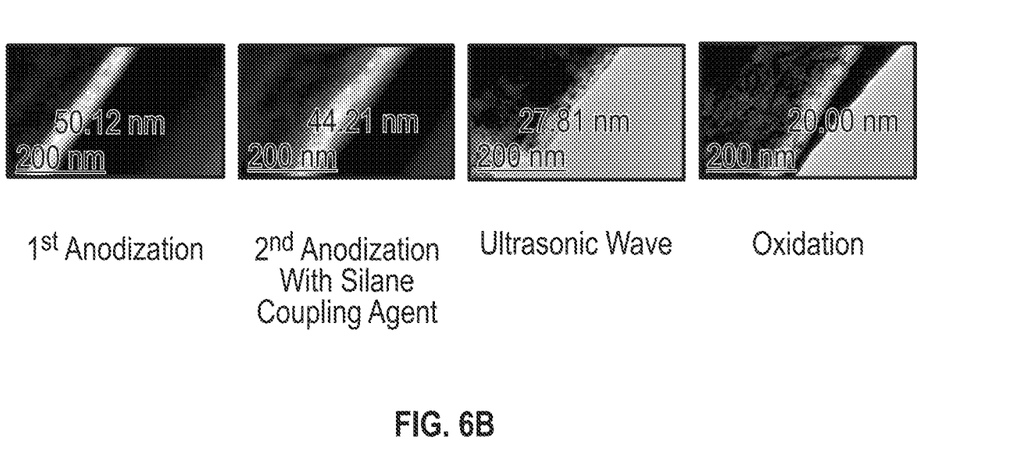

FIG. 2 represents the specific shapes of the oxide film, generated from each process.

After this, specific examples and figures will be explained.

Embodiment 1

In stage (a), the surface of copper is processed with a mixed solution of 5% wt. $H_2SO_2$, 10 wt. % $HNO_3$, 0.1 wt.

% additional additive (surfactant), etc., at 30 to 70° C., while using a 500 ms pulse rectifier, 1~10 A/dm² of current density, with electric etching for 5 to 15 minutes.

In stage (b), a specimen was made only with the first anodizing by leaving it for 1 to 15 minutes with the current density of 0.01~5 A/dm² while using a pulse rectifier at the temperature of 30 to 90° C. in a mixed solvent of 0.01~0.05 wt. % of $NaNO_2$, 0.1~1 wt. % of $NH_4F$ as an adjuvant, and 0.01~0.1 wt. % of $C_2H_4(OH)_2$ as an additive.

Embodiment 2

After the etching treatment with etching from the electricity of stage (a),
    after the first anodizing of the stage (b),
    in the (c) stage, the second anodizing treatment proceeds with a mixed solvent of 0.1~2 wt. % of $C_2K_2O_4$, 0.1~0.5 wt. % of $Na_2O_3Si$ as an adjuvant, 0.01~0.1% of $C_3H_8O_3$ as an adjuvant, and 0.001~0.01 wt. % of $C_{20}H_{24}Na_2O_{10}S_2$ as an adjuvant, while using a pulse rectifier for 500 ms at the temperature of 30 to 70° C., at the current density of 0.01~1 A/dm², for 1 to 10 minutes, on the copper after the first anodizing treatment to produce a specimen.

Embodiment 3

After the etching treatment with etching from the electricity of stage (a),
    after the first anodizing of stage (b),
    a specimen was made by adding a silane coupling additive with an 0.01~1 wt. % additive to the mixed solvent for the second anodizing in stage (c).

Embodiment 4

After the etching treatment with etching from the electricity of stage (a),
    after the first anodizing of stage (b),
    after adding silane coupling additive with an 0.01~1 wt. % additive to the mixed solvent for the second anodizing during the second anodizing in the stage (c),
    a specimen was made with the ultrasonic treatment with a solvent of $H_2SO_4$ of 0.001~0.01 wt. % after adding an additive, $C_2H_4(OH)_2$ of 0.001~0.01 wt. %, for 1 to 3 minutes at 400 W, 24~100 kHz, at the temperature of 30 to 60° C., upon the copper after the second anodizing.

Embodiment 5

After the etching treatment with etching from the electricity of stage (a),
    after the first anodizing of stage (b),
    after adding silane coupling additive with an 0.01 to 1% additive to the mixed solvent for the second anodizing during the second anodizing in the stage (c) 2,
    after the ultrasonic treatment on the copper after the second anodizing,
    a specimen was made by the oxidization treatment with a solvent of $H_2O_2$ of 0.1~3 wt. % after adding an additive, $Na_2S_2O_3$ of 0.001~0.01 wt. %, for 10 seconds to five minutes, at the temperature of 30 to 60° C., on the copper after the ultrasonic treatment.

With the specimens from embodiments 1 to 5, tests were conducted to measure the bonding strength and sealing quality by the resistance test, T-Bend test, tensile strength test, and rest time test. The followings are the results thereof.

[Test 1]

By using the specimens from embodiments 1 to 5, resistance was measured, the capability of carrying-out electricity was confirmed, and the results thereof are notated in Table 1.

TABLE 1

| test piece | embodiment 1 | embodiment 2 | embodiment 3 | embodiment 4 | embodiment 5 |
|---|---|---|---|---|---|
| resistance value (pass current) | good | good | good | good | good |

[Test 2]

By using the specimens from embodiment 1 to 5, to measure the bonding strength, after 1,000 hours of the temperature and humidity test, the T-bend test was conducted and the results thereof are marked in Table 2.

TABLE 2

| test piece | embodiment 1 | embodiment 2 | embodiment 3 | embodiment 4 | embodiment 5 |
|---|---|---|---|---|---|
| T-bend test | No Good | Good | Good | Good | Good |

As shown in Table 2, rather than the specimen from embodiment 1 with the first anodizing, the specimens from embodiments 2 to 5 with the second anodizing show more excellent characteristics in the bonding strength.

Figure 7A:
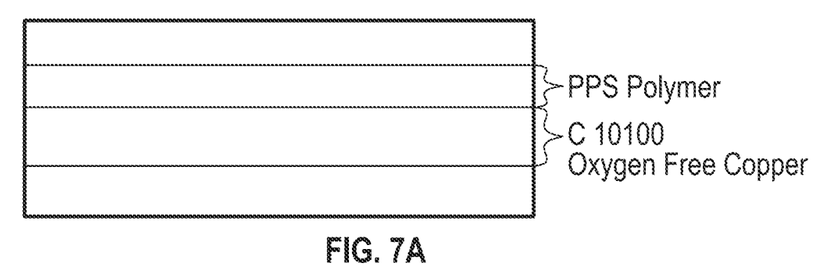

FIG. 7a is a specimen produced for the T-Bend test, and it has the polymer overlaid on the copper specimen from each Example.

Figure 7B:
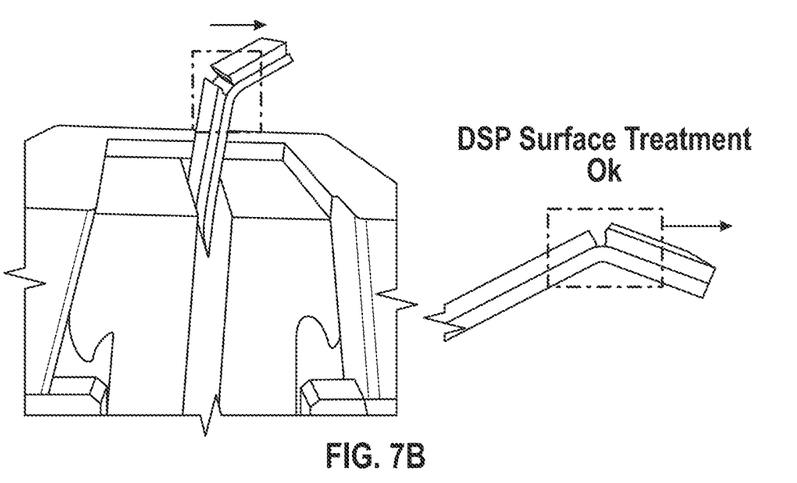
—
FIG. 7B is a picture of the test results showing "Good" quality from the test results of the T-Bend test and how to conduct such a test.

FIG. 7b is a picture of the test results showing "Good" quality from the test results of the T-Bend test and how to conduct such a test.

Figure 7C:
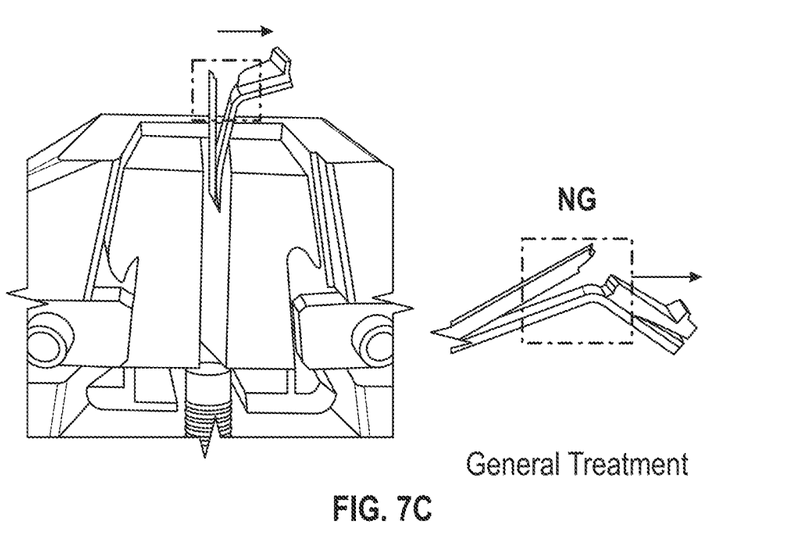
FIG. 7C is a picture of the test results showing "No Good" quality from the test results of the T-Bend test and how to conduct such a test.

FIG. 7c is a picture of the test results showing "No Good" quality from the test results of the T-Bend test and how to conduct such a test.

[Test 3]

By using the specimens from embodiments 1 to 5, to measure the bonding strength, after 1,000 hours of the temperature and humidity test, the T-bend test was conducted and the results thereof are marked in Table 9.

Figure 9:
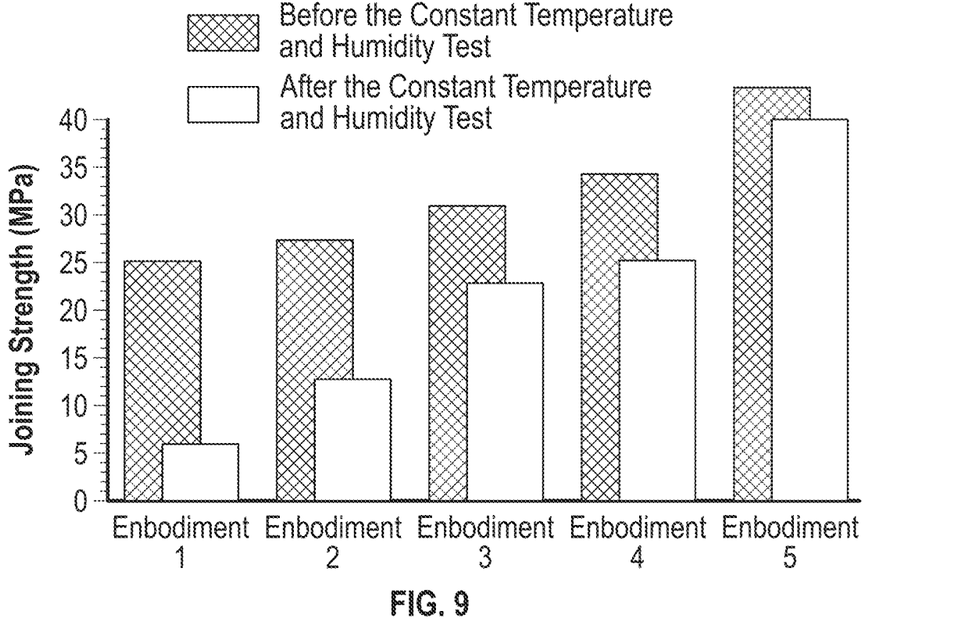
FIG. 9 is the results of the tensile strength test after each test of temperature and humidity after adding an additive and the first and second anodizing.

Just as a graph in FIG. 9, rather than the specimen from embodiment 1, the specimen from embodiment 2 shows excellent tensile strength before and after the temperature and humidity test.

Also, rather than the specimen from embodiment 2, the specimen from embodiment 3 shows excellent tensile strength before and after the temperature and humidity test.

Rather than the specimen from embodiment 3, the specimen from embodiment 4 shows excellent tensile strength before and after the temperature and humidity test.

Finally, rather than the specimen from embodiment 4, the specimen from embodiment 5 shows excellent tensile strength before and after the temperature and humidity test.

Figure 8A:
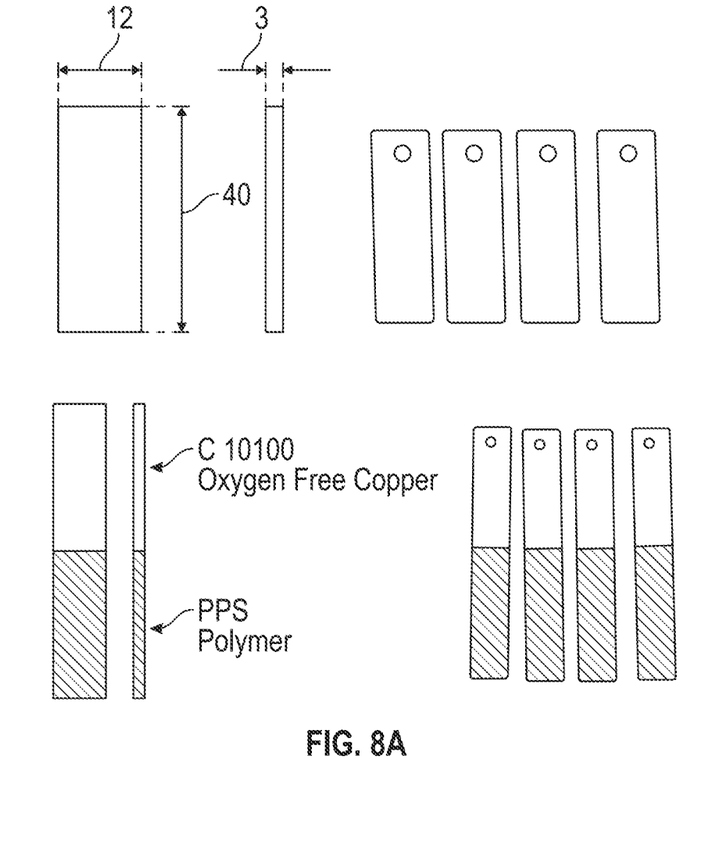
FIG. 8A are top views of a specimen produced for a tensile strength test, and it has the polymer overlaid on the copper specimen from each embodiment.

FIG. 8A is a specimen produced for a tensile strength test, and it has the polymer overlaid on the copper specimen from each embodiment.

Figure 8B:
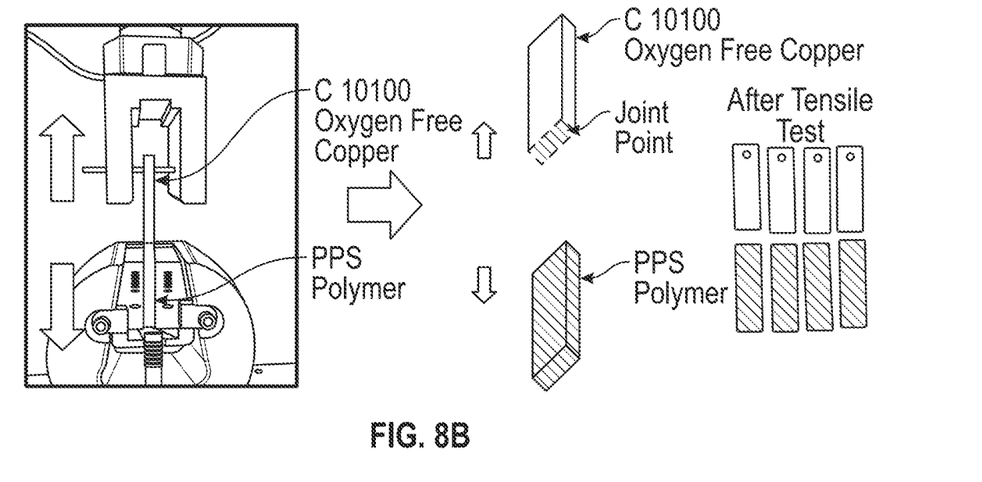
FIG. 8B is a view of the specimen of FIG. 8A placed in an experimental apparatus for testing tensile strength, and views of the specimens after each test of temperature and humidity after adding an additive and the first and second anodizing.

FIG. 8B is a picture of the experimental method of the tensile strength test.

FIG. 10 is a picture of the amount of the polymer remaining on the copper surface, separated from the specimens of embodiments 1 to 5 after conducting the experiments on the tensile strength after the temperature and humidity test.

Figure 10A:
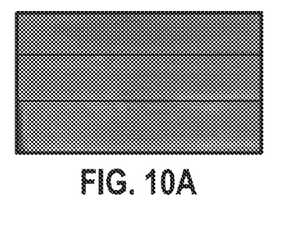
FIG. 10A is a photo of the separated side of the specimen from embodiment 1, showing that it has been conveniently separated and has almost no polymer on the copper surface.

FIG. 10A is a picture of the separated side of the specimen from embodiment 1, showing that it has been conveniently separated and has almost no polymer on the copper surface.

Figure 10B:
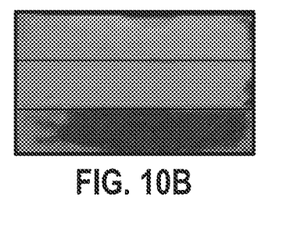
FIG. 10B is a picture of the separated side of the specimen from embodiment 2, showing that 20% of the polymer remains on the copper surface due to the separation.

FIG. 10B is a picture of the separated side of the specimen from embodiment 2, showing that 20% of the polymer remains on the copper surface due to the separation.

Figure 10C:
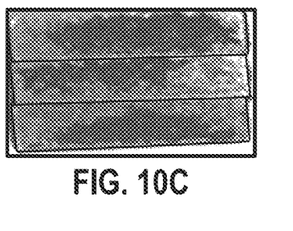
FIG. 10C is a picture of the separated side of the specimen from embodiment 3, showing that 40% of the polymer remains on the copper surface due to the separation.

FIG. 10C is a picture of the separated side of the specimen from embodiment 3, showing that 40% of the polymer remains on the copper surface due to the separation.

Figure 10D:
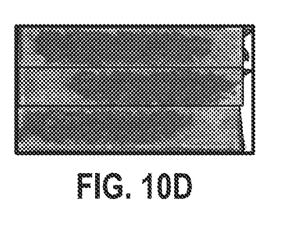
FIG. 10D is a picture of the separated side of the specimen from embodiment 4, showing that 60% of the polymer remains on the copper surface due to the separation.

FIG. 10D is a picture of the separated side of the specimen from embodiment 4, showing that 60% of the polymer remains on the copper surface due to the separation.

Figure 10E:
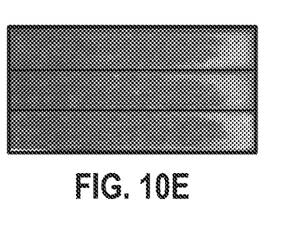
FIG. 10E is a picture of the separated side of the specimen from embodiment 5, showing that 80% of the polymer remains on the copper surface due to the separation.

FIG. 10E is a picture of the separated side of the specimen from embodiment 5, showing that 80% of the polymer remains on the copper surface due to the separation.

Figure 11:
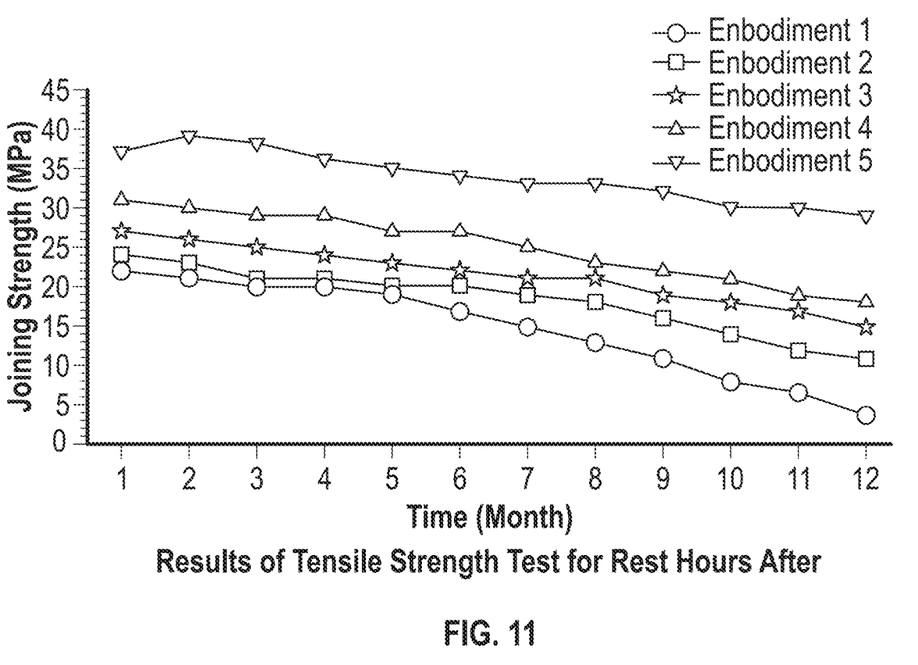
FIG. 11 is a comparative graph of the tensile strength test per rest time after conducting the first and second anodizing and adding the additive.

The graph in FIG. 11 is the test results of the tensile strength 1 to 12 months after overlaying the polymer on the specimens from each embodiment.

Likewise, rather than the specimen from embodiment 1, the specimen from embodiment 2 shows better quality in the decline of the tensile strength as time passes.

Also, rather than the specimen from embodiment 2, the specimen from embodiment 3 shows that tensile strength declines much more as time passes.

Rather than the specimen from embodiment 3, the specimen from embodiment 4 shows that tensile strength declines much more as time passes.

Finally, rather than the specimen from embodiment 4, the specimen from embodiment 5 shows that tensile strength declines much more as time passes.

[Test 4]

Figure 13:
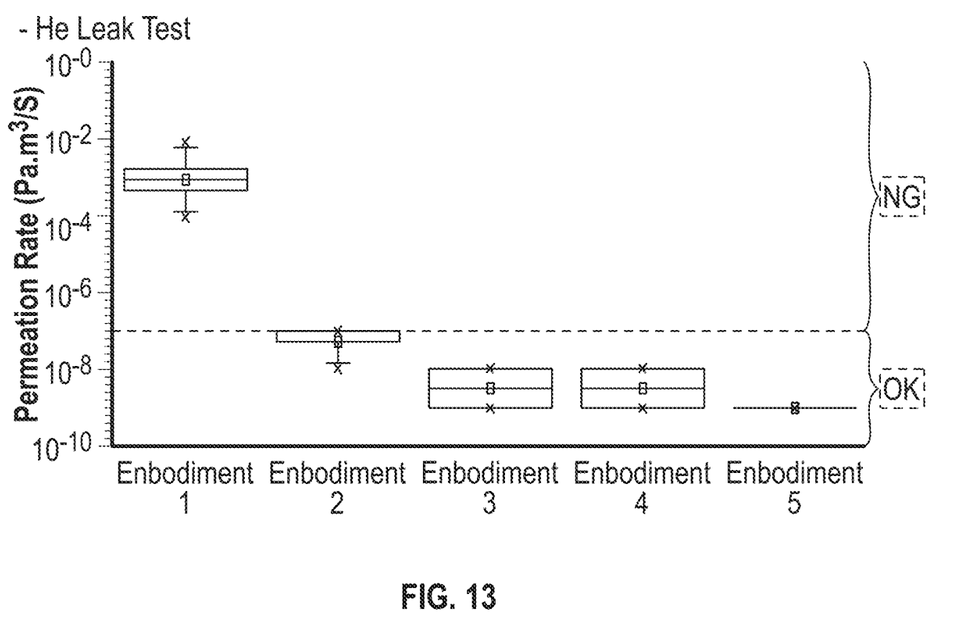
FIG. 13 depicts sealing comparative graphs after conducting the temperature and humidity test, conducting the first and second anodizing, and adding the additive.

By using the specimens from embodiments 1 to 5, to measure the sealing condition between the copper and polymer, the temperature and humidity test was conducted and the results thereof are shown in FIG. 13.

Just as a graph in FIG. 13, rather than the specimen from embodiment 1, the specimen from embodiment 2 shows better sealing quality.

Also, rather than the specimen from embodiment 2, the specimen from embodiment 3 shows better sealing quality.

Also, rather than the specimen from embodiment 3, the specimen from embodiment 4 shows better sealing quality.

Finally, rather than the specimen from embodiment 4, the specimen from embodiment 5 shows the best sealing quality.

Figure 12A:
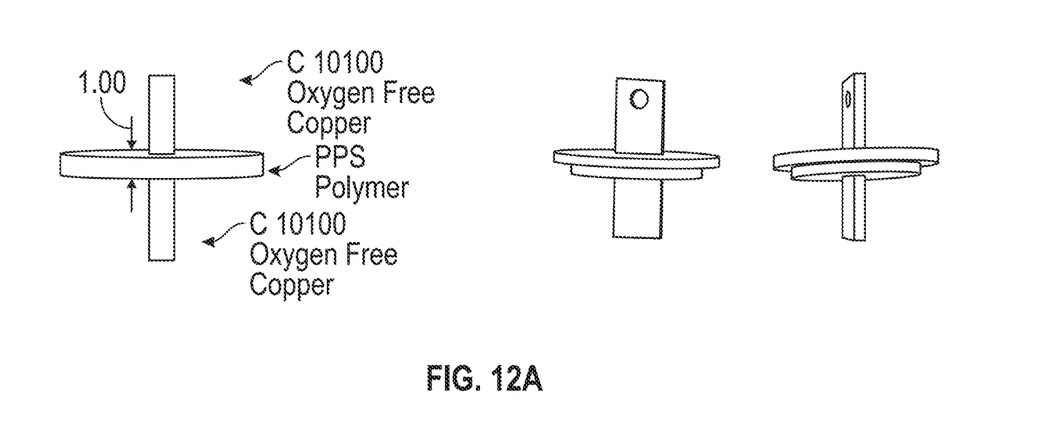
FIG. 12A is a specimen suitable for a temperature and humidity test.

FIG. 12A is a picture of a specimen for a temperature and humidity test.

Figure 12B:
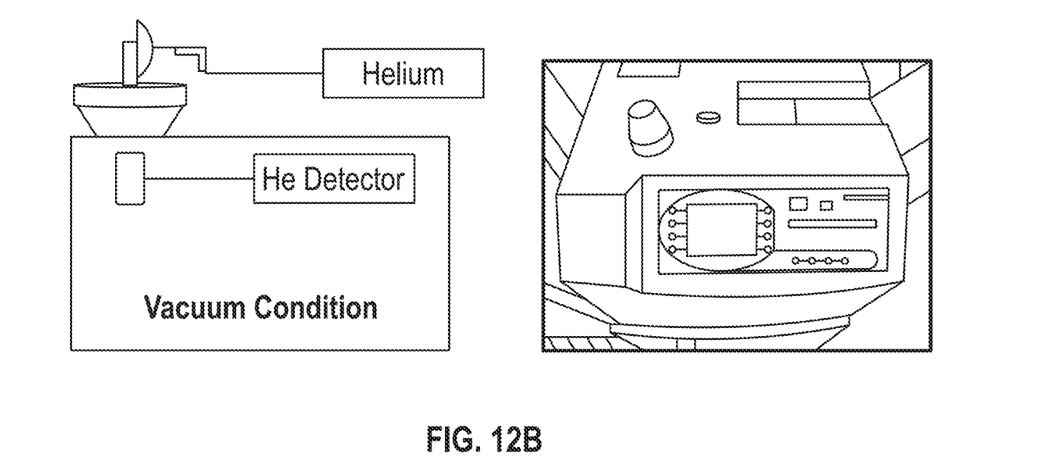
FIG. 12B is a picture of a device to experiment with the temperature and humidity test.

FIG. 12B is a picture of a device to experiment with the temperature and humidity test.

[Feasibility to be Used in Industries]

This invention is a method to manufacture the assembly of the polymer and copper by reinforcing the bonding strength of the polymer and copper with treatments on the copper surface, enhancing the sealing quality of components, making them lighter, and saving money for those components.

The invention claimed is:

1. A method to treat a copper surface for a bonded coupling of a mixture of a polymer and copper, comprising:
    (a) an etching step with electric etching of the surface of copper;
    (b) a first anodizing stage to anodize the surface of copper; and
    (c) a second anodizing stage to anodize the above firstly anodized copper;
wherein the stage (b), including anodizing for 1 to 15 minutes with a current density of $0.01~5$ A/dm$^2$ while using a pulse rectifier at a temperature of 30 to 90° C. in a mixed solution comprising $0.01~0.05$ wt. % of $NaNO_2$ as an electrolyte, $0.1~1$ wt. % of $NH_4F$ as an adjuvant, and $0.01~0.1$ wt. % $C_2H_4(OH)_2$ as an additive; and
wherein in the stage (c), the second anodizing treatment proceeds with a mixed solution comprising $0.1~2$ wt. % of $C_2K_2O_4$ as an electrolyte, $0.1~0.5$ wt. % of $Na_2O_3Si$ as an adjuvant, $0.01~0.1$ wt. % of $C_3H_8O_3$ as an adjuvant, and $0.001~0.01$ wt. % of $C_{20}H_{24}Na_2O_{10}S_2$ as an adjuvant, while using the pulse rectifier for 500 ms at a temperature of 30 to 70° C., at a current density of $0.01~1$ A/dm$^2$, for 1 to 10 minutes.

2. The method of claim 1, wherein in the stage (c), further including adding a silane coupling agent of $0.01~1$ wt. %, which is an additive to the mixed solution.

3. The method of claim 2, wherein in the stage (c), the silane coupling agent as the additive may be one of $(RO)_3Si—(CH_2)_3—NH_2$, $(RO)_3Si—(CH_2)_2—Si(OC_2H_5)_3$, $(RO)_3Si—(CH_2)_3—SH$, $(RO)_3Si—CH=CH_2$, $(RO)_3Si—(CH_3)_3—OOC(CH_3)C=CH_2$, $(RO)_3Si—(CH_3)_3—O—CHCH_2O$ and $(RO)_3Si—(CH_2)_{15}CH_3$.

4. The method of claim 1, wherein the secondly anodized copper is ultrasonically treated after the stage (c).

5. The method of claim 4, wherein the ultrasonic treatment is performed with a solution of $H_2SO_4$ of $0.001~0.01$ wt. % after adding an additive $C_2H_4(OH)_2$ of $0.001~0.01$ wt. %, for 1 to 3 minutes at 400 W, $24~100$ kHz, at a temperature of 30 to 60° C.

6. The method of claim 4, wherein the ultrasonically treated copper is oxidized.

7. The method of claim 6, wherein the oxidization treatment is performed with a solution of $H_2O_2$ of $0.1~3$ wt. % after adding an additive, $Na_2S_2O_3$ of $0.001~0.01$ wt. % for 10 seconds to 5 minutes, at a temperature of 30 to 60° C.

* * * * *